United States Patent [19]

Wood et al.

[11] E Patent Number: Re. 33,110

[45] Reissued Date of Patent: Nov. 14, 1989

[54] CARRYING HANDLE FOR A CAN CARTON

[75] Inventors: Prentice J. Wood, Hapeville; Erwin Doerr, Dunwoody, both of Ga.

[73] Assignee: The Mead Corporation, Dayton, Ohio

[21] Appl. No.: 232,001

[22] Filed: Aug. 15, 1988

Related U.S. Patent Documents

Reissue of:

[64] Patent No.: 4,653,686
Issued: Mar. 31, 1987
Appl. No.: 851,533
Filed: Apr. 14, 1986

[51] Int. Cl.[4] ..... B65D 5/46

[52] U.S. Cl. ..... 229/117.13; 206/141; 206/427

[58] Field of Search ..... 229/40, 52 B; 206/141, 206/427, 434

[56] References Cited

U.S. PATENT DOCUMENTS

| | | | |
|---|---|---|---|
| 1,522,311 | 1/1925 | MacLellan | 229/52 B |
| 2,172,090 | 9/1939 | Powell | 229/52 B |
| 2,785,847 | 3/1957 | Forrer | 206/427 |
| 3,750,874 | 8/1973 | Detzel et al. | 229/52 B |
| 4,195,765 | 4/1980 | Roccaforte et al. | 229/52 B |
| 4,240,546 | 12/1980 | Stone | 206/427 |
| 4,382,510 | 5/1983 | Gaffney | 229/52 B |
| 4,405,078 | 9/1983 | Dutcher et al. | 229/52 B |
| 4,558,816 | 12/1985 | Wood | 206/141 |
| 4,706,876 | 11/1987 | Wilson | 229/52 B |
| 4,712,728 | 12/1987 | Schuster | 229/52 B |
| 4,784,316 | 11/1988 | Crouch | 229/52 B |

*Primary Examiner*—Gary Elkins
*Attorney, Agent, or Firm*—Rodgers & Rodgers

[57] ABSTRACT

A can carton having interconnected top, bottom and side walls and end closure panels is provided with a perforated transverse slit extending completely across one carton wall and having end projections extending into the two carton walls interconnected therewith together with a pair of transverse handle flaps struck from the top carton wall or from the top carton wall and from the side walls interconnected therewith and foldably joined respectively thereto by arcuate transverse fold lines.

9 Claims, 2 Drawing Sheets

CARRYING HANDLE FOR A CAN CARTON

Matter enclosed in heavy brackets [ ] appears in the original patent but forms no part of this reissue specification; matter printed in italics indicates the additions made by reissue.

TECHNICAL FIELD

This invention relates generally to can cartons and more particularly to carrying handles for such cartons.

BACKGROUND ART

U.S. Pat. No. 4,558,816 issued Dec. 17, 1985 and owned by the assignee of this invention discloses a can carton in which a pair of handle panels are struck from one carton wall and whose adjacent edges are coincidental with a transverse perforated slit extending across the one carton wall and having end projections extending into the carton walls foldably joined with the one carton wall, the fold lines for the handle panels being straight and substantially parallel with each other.

DISCLOSURE OF THE INVENTION

According to this invention in one form, a carrying handle for a carton formed from a unitary blank and having interconnected top, bottom and side walls and end closure panels includes a perforated transverse slit formed in a central part of the blank and extending completely across one of the interconnected carton walls and having end projections extending into the two carton walls interconnected therewith, a first transverse handle flap struck from said central part of the blank and foldably joined thereto by a first arcuate fold line, together with a second transverse handle flap struck from said central part of the blank and foldably joined thereto by a second arcuate fold line the perforated transverse slit defining coincidental transverse edges of both of the handle flaps.

BEST MODE OF CARRYING OUT THE INVENTION

Figure 1:
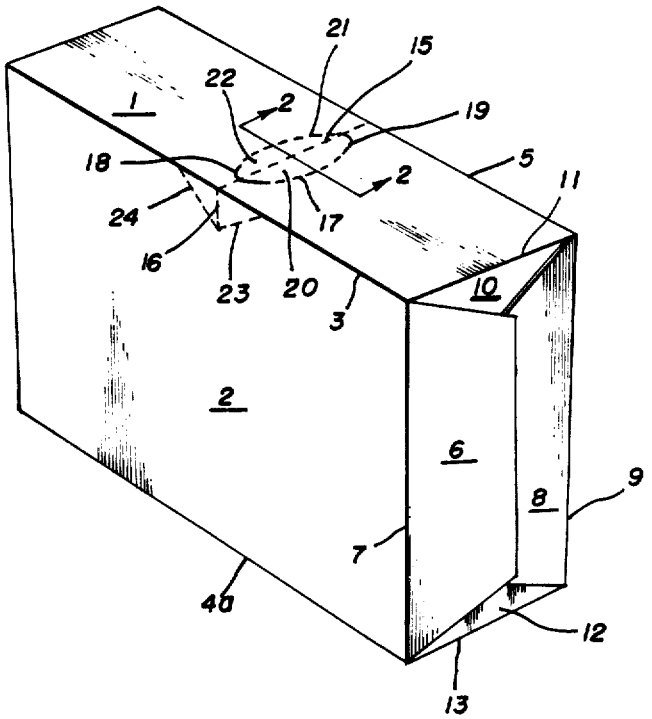
FIG. 1 is a perspective view of a loaded set up can carton which embodies the handle structure of this invention.
Figure 2:
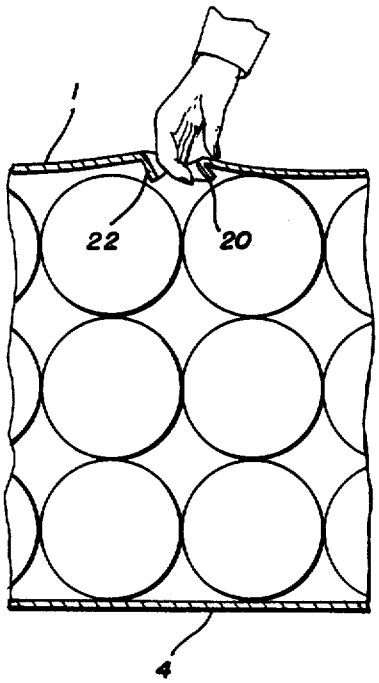
FIG. 2 is a cross sectional view taken along the line designated 2—2 in FIG. 1.

With reference to FIG. 1 the can carton includes a main wall designated by the numeral 1 to which a side wall designated by the numeral 2 is foldably joined along fold line 3. A bottom wall 4 as shown in FIG. 2 is foldably joined to side wall 2 along fold line 4a and to a side wall 2a opposite from side wall 2 which is not observable in FIG. 1, a fragment of which appears in FIGS. 4, 5 and 6. Side wall 2a is foldably joined to main wall 1 along fold line 5.

The closure panels for both ends of the carton are identical. As is apparent from FIGS. 1 and 3, panel 6 is foldably joined to the side wall 2 along fold line 7 while panel 8 is foldably joined along a fold line 9 to the side wall 2a. End flap 10 is foldably joined to carton wall 1 along fold line 11 while end flap 12 is foldably joined to the bottom wall 4 along fold line 13. Flaps 6, 8, 10, and 13 are disposed in overlapping relation as shown in FIG. 1 and are secured by known means to form an end closure for the carton.

Figure 3:
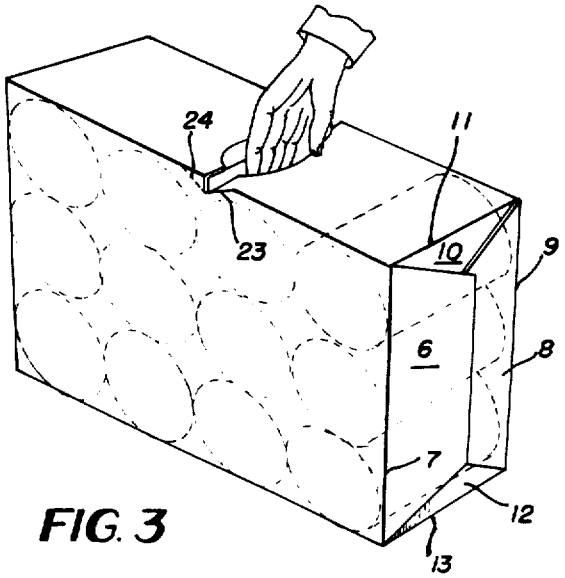
FIG. 3 is a view similar to FIG. 1 and shows the carton in lifted condition.

As is apparent from FIG. 3, three rows of four cans each are disposed within the carton and arranged with their axes in parallel relation to each other.

Figure 4:
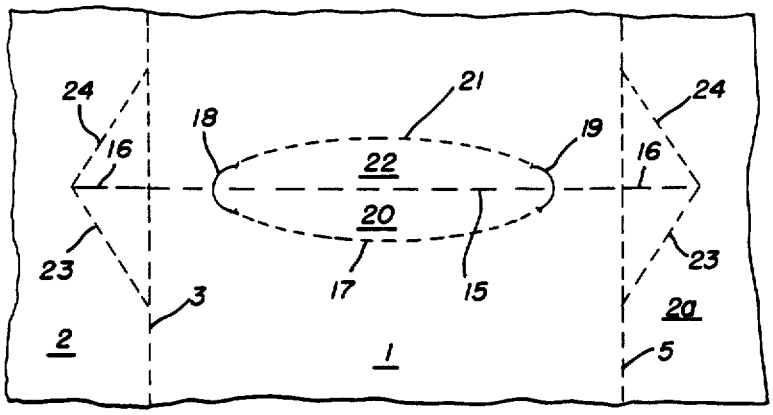
FIG. 4 is an enlarged part of a portion of a blank from which the handle structure of the carton is formed according to a preferred embodiment of the invention.

With reference to FIGS. 1 and 4, a transverse perforated slit 15 is formed in top wall 1 and extends completely across that wall. In addition this perforated slit includes end projections 16 which extend downwardly into side wall 2 and also into the opposite side wall 2a.

According to a feature of this invention, an arcuate fold line 17 is formed in the central part of the blank and a pair of arcuate slits 18 and 19 interconnect the ends of fold line 17 with the transverse perforated fold line 15 to define a handle flap generally designated by the numeral 20. An arcuate fold line 21 interconnects the ends of arcuate slits 18 and 19 and with parts of those slits and the perforated slit 15 define a second handle flap 22.

A fold line 23 is formed in side wall 2 and a similar fold line is formed in side wall 2a. These fold lines extend from the extremities of end projections 16 of perforated slit 15 and intersect fold lines 3 and 5 respectively. Similarly fold lines 24 extend from the extremities of projections 16 to the fold lines 3 and 5 respectively. Fold lines 23 and 24 are disposed from projections 16 by angles which are equal.

In using the handle flap as shown in FIGS. 1–4 to lift and carry the carton, the fingers of the user are inserted against the flap such as 20 as shown in FIG. 2. This operation causes the flap 20 to swing inwardly about its arcuate fold line 17 to occupy a position of angular relation relative to carton wall 1. The angular disposition of handle panel 20 is determined by the arcuate configuration of fold line 17 according to a feature of this invention. Thus with the handle panel 20 disposed in angular relation to carton wall 1, substantial mechanical reinforcement is provided for the carton particularly in the area of carton wall 1.

Lifting of the carton causes an inward bending of the triangular structure defined by slit 16, fold line 23, and fold line 3. This operation results in distribution of the load over a wide area of the carton side wall as well as the carton wall 1 from which the handle panel 20 is struck.

As is obvious, handle panel 22 functions in a manner identical to the functioning of handle panel 20 and fold lines 24, 3 and slit 16 cooperate in a manner similar to that described in conjunction with fold lines 23 and 3 as well as slit 16.

Figure 5:
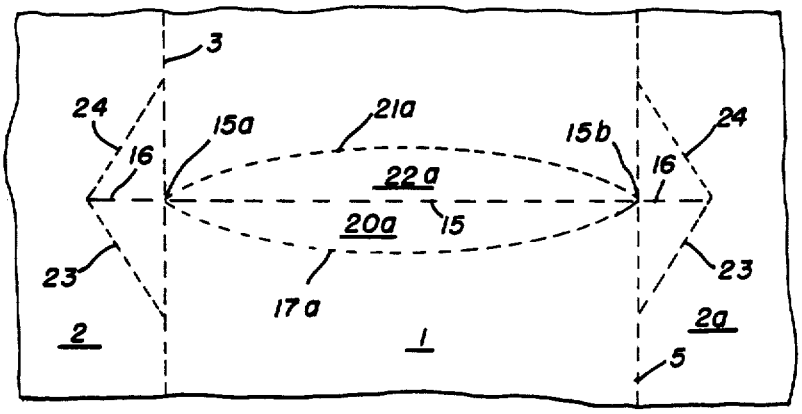
FIG. 5 is a view similar to FIG. 4 but which shows a modification of the invention and FIG. 6 is a view similar to FIGS. 4 and 5 and shows a second modification of the invention.

For some applications of the invention, it may be desirable to employ handle flaps such as are designated at 20la and 22a as shown in FIG. 5. These handle flaps extend completely across the carton wall 1 and corresponding ends of arcuate fold lines 20a and 21a intersect at points 15a and 15b is shown in FIG. 5 which points of intersection correspond with the points of intersection of perforated transverse slit 15 and fold lines 3 and 5. This modification of the invention dispenses with the end slits 18 and 19 which are employed with the arrangement of FIG. 4 and also contemplates handle flaps 20a and 22a which are longer than the corresponding handle flaps 20 and 22 are represented in FIG. 4. The arrangement of FIG. 5 is well suited for use in conjunction with large heavy packaged cans.

Figure 6:
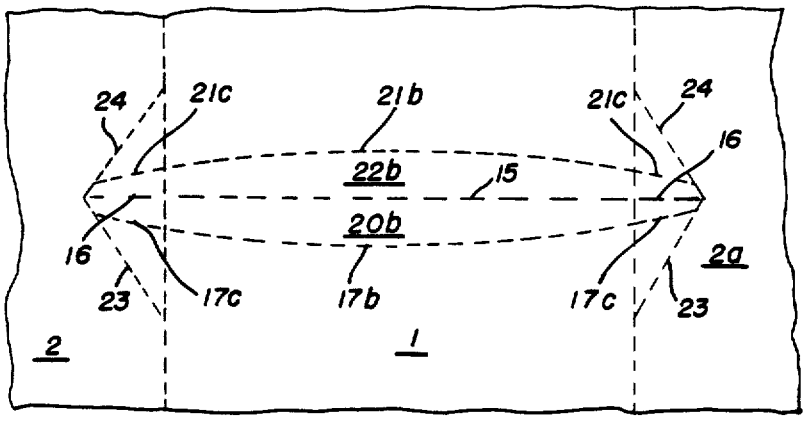

The handle arrangement shown in FIG. 6 constitutes still another modification of the invention according to which the handle flaps such as 20b are foldably joined to carton wall 1 along arcuate fold line 17b which include end projections 17c which extend into carton walls 2 and 2a. Similarly handle flap 22b is foldably joined to the carton blank along an arcuate fold line 21b which includes end projections 21c which extend into the carton walls 2 and 2a as shown in FIG. 6. As is apparent in FIG. 5 end projections 17c intersect fold lines 23 in carton walls 2 and 2a while end projections 21c of arcuate fold line 21b intersect fold lines 24 formed in carton walls 2 and 2a. The arrangement of FIG. 6 is advantageous in that the handle flaps 20b and 22b extend into the carton walls 2 and 2a and thus distribute the load to these walls directly rather than indirectly as is the case with the arrangements shown in FIGS. 4 and 5.

*As clearly shown in FIGS. 4, 5 and 6 these "arcuate" fold lines are spaced apart at their midpoints by a distance greater than the distance between these fold lines at points adjacent their ends.*

INDUSTRIAL APPLICABILITY

By this invention, the use of arcuate fold lines to interrelate handle flaps with a carton wall determines the angular disposition of the associated handle flap and in turn is employed to control the magnitude of reinforcement provided by the handle flaps.

We claim:

1. A carrying handle for a carton formed from a unitary blank for packaging a plurality of cans and having interconnected top, bottom and side walls and end closure panels, said handle comprising a perforated transverse slit formed in a central part of said blank and extending completely across said top wall and having end projections extending into said side walls, a first transverse handle flap struck from said central part of said blank and foldably joined thereto by a first arcuate fold line, and a second transverse handle flap struck from said central part of said blank and foldably joined thereto by a second arcuate fold line, said perforated transverse slit defining coincidental transverse edges of both of said handle flaps.

2. A carrying handle according to claim [1] *9* [wherein said transverse handle flaps are struck from said top wall and] wherein a pair of spaced apart [arcuate] slits are disposed astride said perforated transverse slit and respectively interconnect corresponding ends of said [arcuate] *first and second* fold lines.

3. A carrying handle according to claim [2] *9* wherein said pair of [arcuate] slits are spaced from the adjacent side edges respectively of said top wall.

4. A carrying handle according to claim 1 wherein adjacent ends of said first and second arcuate fold lines intersect at the points of intersection respectively of said perforated transverse slit and opposite side edges of said top wall.

5. A carrying handle according to claim 1 wherein said first and said second arcuate fold lines extend completely across said top wall and include end projections which extend into the two side walls interconnected therewith.

6. A carrying handle according to claim 5 wherein a pair of fold lines are formed in each of the side walls which are interconnected with said top wall, each of said fold lines extending from the extremity of the associated end projection of said perforated transverse slit to the adjacent carton corner between said top wall and each of said side walls and wherein each of said end projections of said first and second arcuate fold lines intersects one of said pair of fold lines.

7. A carrying handle according to claim 6 wherein the angles between each of said fold lines and the corresponding one of said end projections of said perforated transverse slit are equal.

8. A carrying handle according to claim 7 wherein each of said end projections of said first and second arcuate fold lines intersects a different one of said fold lines at a point thereon which is spaced from the extremity of the corresponding one of said end projections of said transverse perforated slit.

*9. A carrying handle for a carton formed from a unitary blank for packaging a plurality of cans and having interconnected top, bottom and side walls and end closure panels, said handle comprising a perforated slit formed in and extending transversely in said top wall, a first transverse handle flap struck from said top wall and foldably joined thereto by a first fold line, and a second transverse handle flap struck from said top wall and foldably joined thereto by a second fold line, said first and said second fold lines being of arcuate configuration and said perforated transverse slit defining coincidental transverse edges of both of said handle flaps.*

* * * * *